United States Patent
Price

[19]

[11] Patent Number: 5,836,718
[45] Date of Patent: Nov. 17, 1998

[54] METHOD AND APPARATUS FOR EX SITU CLEANING OF CONTAMINATED SOIL

[76] Inventor: Philip A. Price, 32917 NE. 134th St., Duvall, Wash. 98019

[21] Appl. No.: 782,613

[22] Filed: Jan. 13, 1997

[51] Int. Cl.[6] ............................... A62D 3/00; B09C 1/06
[52] U.S. Cl. ........................ 405/128; 210/909; 405/131; 588/209; 588/230; 588/249; 588/900
[58] Field of Search ................................... 405/128, 131; 588/205, 209, 228, 230, 249, 900; 210/908, 909

[56] References Cited

U.S. PATENT DOCUMENTS

| | | | |
|---|---|---|---|
| 4,842,448 | 6/1989 | Koerner et al. | 405/128 X |
| 4,913,065 | 4/1990 | Hemsath . | |
| 4,977,839 | 12/1990 | Fochtman et al. . | |
| 4,982,788 | 1/1991 | Donnelly | 166/266 |
| 4,984,594 | 1/1991 | Vinegar et al. | 405/129 X |
| 5,011,329 | 4/1991 | Nelson et al. | 405/128 |
| 5,067,852 | 11/1991 | Plunkett | 405/128 |
| 5,103,578 | 4/1992 | Rickard . | |
| 5,114,497 | 5/1992 | Johnson et al. | 405/128 X |
| 5,149,444 | 9/1992 | Hoch | 405/128 |
| 5,169,263 | 12/1992 | Johnson et al. | 405/128 |
| 5,193,934 | 3/1993 | Johnson et al. | 405/128 |
| 5,200,033 | 4/1993 | Weitzman | 588/209 X |
| 5,209,604 | 5/1993 | Chou | 405/128 |
| 5,213,445 | 5/1993 | Ikenberry et al. | 405/128 |
| 5,228,804 | 7/1993 | Balch | 405/128 |
| 5,244,310 | 9/1993 | Johnson | 405/128 |
| 5,261,765 | 11/1993 | Nelson . | |
| 5,265,978 | 11/1993 | Losack | 405/128 |
| 5,271,693 | 12/1993 | Johnson | 405/128 |
| 5,318,116 | 6/1994 | Vinegar et al. | 166/60 |
| 5,325,795 | 7/1994 | Nelson et al. | 405/128 X |
| 5,340,236 | 8/1994 | Ikenberry | 405/128 |
| 5,360,067 | 11/1994 | Meo, III | 166/256 |
| 5,375,539 | 12/1994 | Rippberger | 588/213 X |
| 5,514,286 | 5/1996 | Crosby | 210/742 |
| 5,567,324 | 10/1996 | Rothmel et al. | 210/909 X |
| 5,625,119 | 4/1997 | Tischler | 588/209 X |

*Primary Examiner*—George A. Suchfield
*Attorney, Agent, or Firm*—Seed and Berry LLP

[57] ABSTRACT

A method for ex situ cleaning of contaminated soil using a closed system of heat-conductive solid-walled pipes embedded in the contaminated soil, the pipes being in communication with the heat source that heats and circulates air throughout the system of pipes, the method having the following steps of placing the contaminated soil in a heap on the pipes, substantially enclosing the soil heap with a vapor barrier, circulating heated air throughout the pipes to elevate the temperature of the surrounding soil to a temperature sufficient to cause vaporization of soil contaminants, extracting the vapor containing soil contaminants from the enclosed soil heap, and treating the vapor to remove contaminants and recycling the vapor.

6 Claims, 3 Drawing Sheets

METHOD AND APPARATUS FOR EX SITU CLEANING OF CONTAMINATED SOIL

TECHNICAL FIELD

The present invention relates to the remediation of contaminated soil, and, more particularly, to a method of vaporizing soil contaminants through indirect heating and extracting the contaminants from the vapor.

BACKGROUND OF THE INVENTION

Commercial and industrial activities in the United States result in the discharge or spillage of chemicals into the environment. Many chemicals pose a serious threat to the aquifers, which are used as a source of public drinking water and for agricultural purposes.

The greatest threat to the aquifer is contamination from the soil. To stop this pollution, it is necessary to remove and remediate soil that is contaminating the aquifers. In many cases, soil contaminated by toxic substances is removed to protect people from direct exposure. Service stations are known to be the major contributors to soil contamination because they are sources of benzene and related compounds from fuels and oils.

Chemicals are sometimes spilled or dumped on the ground where they are dissolved or otherwise incorporated in the aquifers recharge water. In the case of large spills of liquids, the chemicals may travel unaltered into the unsaturated zone. Often, the chemicals reach the aquifer after being subjected to physical or chemical transformation processes, such as volatilization, sorption, biodegradation, hydrolysis, or oxidation. In general, most of the chemicals are volatile organic compounds (VOC's). The most cost-advantageous method for protecting the environment from this type of contamination is the prevention of spills. After a spillage, the cost-effective clean-up method is to remediate the central source area of the spill before the contaminants migrate outward and downward toward the aquifer.

Because of the inherent volatility of many contaminants, directly applied soil vapor extraction technologies is one of the most effective and inexpensive remedial methods for both in situ and ex situ. For semi-volatile contaminants, enhancement of conventional soil vapor extraction processes can be initiated by applying heat in situ, in various manners, as disclosed in U.S. Pat. Nos. 4,982,788; 5,114,497; and 5,482,402.

Major problems arising during in situ applications are caused by the requirement of pressurizing the injection air. Often short-circuiting of heated air through less dense soils, either horizontally or vertically, will result in substantial losses of heat energy, contaminated vapors and condensed liquids. Mechanical problems include the short-circuiting of pathways immediately adjacent to the hot air injection pipes, wherein the hot pipes preferentially dry the adjacent soil, increasing its porosity with subsequent loss of pressure and heat energy. Lack of control of subsurface air flows is a major drawback, as is the difficulty in reasonably determining whether clean-up targets have been met.

Ex-situ applications of thermally enhanced soil vapor extraction have been previously attempted, as disclosed in U.S. Pat. Nos. 5,067,852; 5,213,445; and 5,228,804. These patents discuss using various heat exchanging and heat recycling methods within a soil heap configuration. All of these methods, in situ and ex situ, require the introduction of hot air directly to the soil through use of high pressures and usually require an opposing low pressure on the vapor extraction side of the process. This creates a pressure differential or vacuum that sweeps the volatilized contaminants out of the soil along with the injected hot process air.

These methods require that the injection pipes be perforated such that a predetermined volume of hot air is directly forced into the soil and passes through the soil toward areas of lower pressures. In ex situ applications, when high pressures are applied, short-circuiting toward the sides of the soil heap and leakage from pipe connections is problematic. Balancing the distribution of hot air throughout the soil heap is difficult due to varying soil characteristics (soil moisture, grain size, compaction, etc.) and heap configurations.

Because of the highly variable nature of remediation projects, such as the optimum sizing and placement of the injection pipe orifices, the proper rates of air flow, and the applied pressures, the technology becomes impractical to implement. For instance, loss of necessary hot air flows and pressures is inefficient. An excess of either will blow channels through the side walls of the soil heap, often causing temperature differentials within the soil heap in excess of 150° C. Too low pressure or air flow creates a "ponding" effect within the ends of each hot air injection pipe. When applied pressures are not sufficient to evenly discharge hot air flow throughout the length of each pipe, especially through to the ends of the pipes, a pooling of cooler air towards the pipe ends dramatically reduces soil heating and treatment effectiveness.

The present invention eliminates all of these problems. The previous in situ and ex situ methods rely on nearly 100% convective air flows, meaning that all of the injected hot air is forced into the soil heap through orifices pre-drilled into the injection pipes. The hot air travels through the pore spaces of the soil, volatilizing the contaminants, which are then swept out along with the process air to be collected by vapor extraction pipes. The current invention achieves contaminant mass transfer not by convective heating means, but by conductive heat exchanging. The method and apparatus of the present invention thus improves upon the state of the art and permits reliable, safe and economic remediation of semi-volatile compounds, including PCB's and PAH's.

While the present invention is directed predominantly toward dry cleaners, paint shops and military bases, which are potential sources of such solvents as trichloroethane, polychlorinated biphenyls (PCB's) and poly-aromatic hydrocarbons (PAH's), it will have application wherever vaporization of contaminated soil is desired.

SUMMARY OF THE INVENTION

The present invention is directed to a method and apparatus for ex situ cleaning of contaminated soil using a closed system of heat-conductive solid-walled pipes embedded in the soil. The pipes are in communication with a heat source that heats and circulates air throughout the closed system of pipes. The method comprises the steps of placing the contaminated soil in a heap on the pipes; substantially enclosing the soil heap with a vapor barrier; circulating heated air throughout the pipes to elevate the temperature of the surrounding soil to a temperature sufficient to cause vaporization of soil contaminants; extracting the vaporized soil contaminants from the enclosed soil heap; and treating the vaporized soil contaminants to remove the soil contaminants from the vapor. Ideally, the treated vapor is recycled to either the environment or to the heat source.

In accordance with another aspect of the present invention, the step of circulating the heated air comprises elevating the temperature of the surrounding soil to a temperature in the range of 90° C. to 250° C.

In accordance with a further aspect of the present invention, a method for ex situ cleaning of contaminated soil using an array of heat-conductive solid-walled pipes is provided. The pipes are in fluid communication with a heat source that heats and circulates the fluid throughout the system of pipes. The method comprises the system of forming a vapor barrier base; placing the array of solid-walled pipes over the base and covering the array of pipes with a heap of contaminated soil; and circulating heated fluid throughout the array of pipes to cause vaporization of soil contaminants. Ideally, the heated fluid is air.

In accordance with yet another aspect of the present invention, the step of placing the array of pipes over the vapor barrier base includes placing a layer of soil over the vapor barrier base and then placing the array of pipes on the layer of soil.

In accordance with yet another aspect of the present invention, the step of covering the array of pipes with the soil heap further comprises substantially enclosing the soil heap with a vapor barrier covering.

In accordance with yet another aspect of the present invention, the step of circulating heated fluid throughout the array of pipes comprises elevating the temperature of the surrounding soil to 100° C. and higher.

As will be readily appreciated from the foregoing, the present invention provides an effective and efficient method of heating and treating contaminated soil using an array of unperforated or solid-walled hot conduits to provide conductive heating. The recirculating hot air supply remains uncontaminated, effectively transferring heat to the soil and progressively elevating the soil temperature. The elevated soil temperature serves to vaporize the contaminants, which are then evacuated and treated using the heat source for the circulating air. Non-corrosive vapors are directed to the heat source as a secondary fuel source. The present invention eliminates problems inherent in pressurized hot air systems. In addition, keeping the temperature below 400° C. inhibits furan and dioxin formation. By entraining the contaminants in the water vapor, they are more easily swept out of the soil heap in the direction established by the vapor-pressure gradient created through the conductive heating.

The current invention resulted from the desire to provide an improved method for remediation of soil contaminated with PCB's PAH's motor and crude oil Minor adaptation to the apparatus provides a means to remediate spills of numerous industrial wastes, including highly corrosive compounds in a simple efficient and environmentally beneficial manner. The present invention provides an ex situ method for quickly remediating soil at a spill site and placing the soil back into the original excavation. It is particularly suited for quick mobilization to a spill site, operating in compact quarters, and safely operating in suburban or urban settings.

The invention further provides an ex situ method of remediation of soil by excavating the soil and construction of a treatment cell having emplaced therein conduits for inlet hot air placed intermediate throughout the cell in a spaced array which insures efficient conductive heating of soil. The hot air conduits have no perforations or other devices that allow air leakage to the soil. Each conduit is a part of a closed heating loop within the treatment cell. All injected hot air is routed through the loop and returns to the furnace chamber (or adjacent to it) for reheating and reinjection into the treatment cell. The current invention's heating method maintains a process air stream separate from the contaminant air stream, thus minimizing vapor treatment cost. The current invention's conductive heat transfer permits remediation of soil with low permeability, high moisture content and precludes potential problems of hot air short circuiting inherent in pressurized systems. Thorough field evaluations of conductive heat exchanging using this conductive heat transfer process proves it to be much more reliable than pressurized systems in the area of thermally enhanced soil vapor extraction applications. It is observed that soil heating by thermal conduction is very uniform because there is slight variation in the thermal conductivity properties of soil. High boiling point contaminants are removed by steam distillation in the presence of water vapor at temperatures well below the contaminants normal boiling point. The invention is simple in design because it does not use high pressures or high temperatures, resulting in low labor and equipment costs.

BRIEF DESCRIPTION OF THE DRAWINGS

The foregoing and other features and advantages or the present invention will be more readily appreciated as the same become better understood from the accompanying detailed description when taken in conjunction with the following drawings.

DETAILED DESCRIPTION

Figure 1:
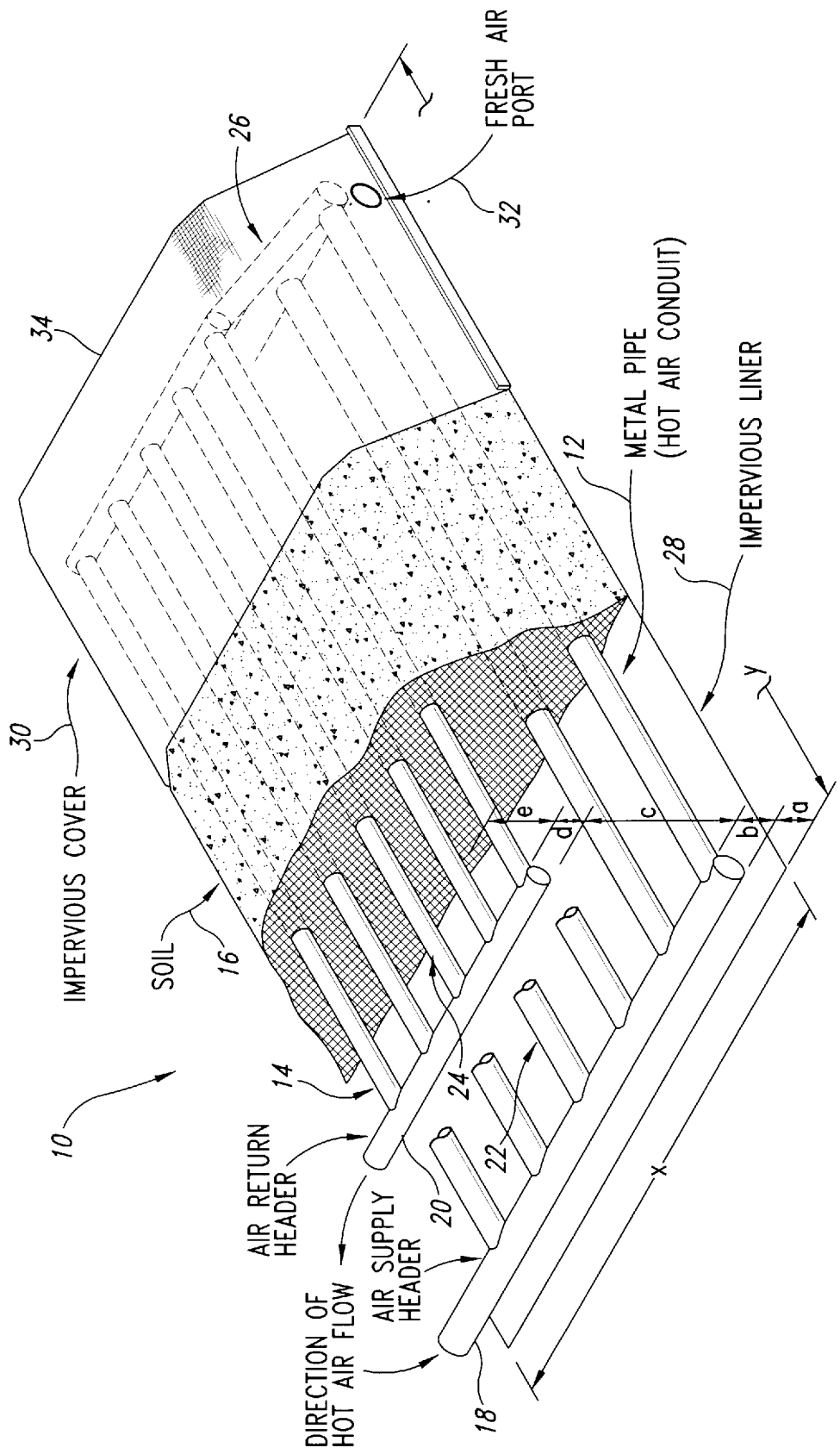
FIG. 1 is an illustration of the array of pipes embedded in a contaminated soil heap that is enclosed in a vapor barrier in accordance with the method of the present invention.

The current invention provides a simple and mobile ex situ method of cleaning excavated contaminated soil by placing the soil in an enclosed heap and circulating hot air within the heap through an array of closed-loop conduits. The heated air promotes elevated soil temperatures that serve to vaporize the contaminants using an indirect heating process. The method and apparatus of the present invention involves conductive heat transfer using embedded hot conduits that, most uniquely, have no perforations. Thus there is no mixing of the hot process air with the evolved vapors. A closed loop or array of relatively large-diameter conduits are routed into and then out of the soil heap. The hot conduits conductively transfer heat (i.e. heat exchanges) into the soil, progressively elevating the soil temperature and resulting in volatilization of the contaminants.

The conduit temperatures are optimally about 300° C. and are kept below 375° C. while treating chlorinated compounds, thus inhibiting formation of dioxins and furans. Ideally, the hot air circulated through the conduits has a temperature in the range of 200° C. to 375° C., and preferably is 300° C. Volatile organic compounds (VOC's) and PCB's are continuously drawn off as moisture within the soil is vaporized and the resultant steam sweeps the volatilized contaminants upward and outward toward collection ducts placed above the soil heap and under an impervious covering.

The present invention dramatically improves the state of the art for ex situ, thermally-enhanced soil vapor extraction by eliminating problems inherent in pressurized hot air systems. More specifically, this includes cool-air ponding within hot air injection pipes, short-circuiting (leaking) of hot air out of soil heap sidewalls and pipe junctions, and unnecessary mixing of process air with volatilized contaminants. A heat booster is used to continuously elevate air temperatures inside the hot conduits embedded within the soil heap. A burn unit may be configured for direct discharge of exhaust gases and cleaned vapor into the hot air supply header and hot conduit array, or it may use a heat exchanger for indirect heating. The heat booster's burn unit may serve to oxidize evolved vapor drawn from the soil heap. The evolved vapor may serve as a secondary fuel source. Choice of the optimum heat booster configuration depends on the corrosivity of the contaminants and other factors.

The total remediation time for soil batches of from 500 cubic yards to 1000 cubic yards is approximately 10 days. Being constrained to less than 400° C. to inhibit furan and dioxin formation limits the remediation rate (speed). The treatment rate varies with temperature, soil composition, moisture content and contaminant type. Thorough field study shows three distinct treatment phases: The warm up phase, the boiling-rate limiting phase (or constant-rate period) and the breakaway heating phase (or falling-rate period).

Phase one, the warm up phase is typically 2 to 3 days in length or longer, depending on original soil temperature. Little actual remediation takes place during the warm-up phase. Phase two, the boiling-point limiting phase is typically 4 to 5 days in length depending on the beginning soil moisture content. Soil moisture in excess of an optimal 5% to 10% increases the run time for this phase by approximately one additional day for each 2.5% of added soil moisture. Rapid run-up of soil heap temperatures are typical of phase three, the breakaway heating phase which typically occurs when overall soil moisture content is reduced to less than 1% by weight. Typically 50% of the contaminant mass will be removed during a two-day interval when soil moisture has been reduced from 2% to 0.5% by weight. Soil treatment is completed within 2 to 3 days following the initiation of the breakaway phase.

Depending predominantly upon the initial moisture content, several mechanisms are known that to a greater or lesser extent, may serve to propagate heat and provide mass transfer means within the soil heap. Perry's Chemical Engineers' Handbook, 6th Ed., Section 20 entitled "Solids Drying and Gas-Solid Systems", incorporated herein by reference, describes the mechanisms as (1) diffusion, (2) capillary flow, (3) flow caused by shrinkage and pressure gradients, (4) flow caused by gravity and (5) flow caused by a vaporization-condensation sequence. Each of the 5 mechanisms is present to varying extends throughout the treatment process, but the dominant treatment mechanism is diffusion of moisture away from the hot air conduits by setting up a vapor-pressure gradient. The ability to establish such a vapor-pressure gradient by means of conductive heating is the essence of the current invention and represents a significant improvement over the prior art, which has ceaselessly applied high pressures by artificial means to induce desired pressure differentials.

Field tests by the inventor indicate that the presence of soil moisture in the amount of 5% to 10% by weight improves the effectiveness of the treatment process. The soil moisture is important to the diffusion and vaporization-condensation mechanisms, which essentially are the carrier means for the removal of contaminants. The contaminants are entrained by the water vapor and swept out of the soil heap in the direction established by the vapor-pressure gradient.

Figure 2:
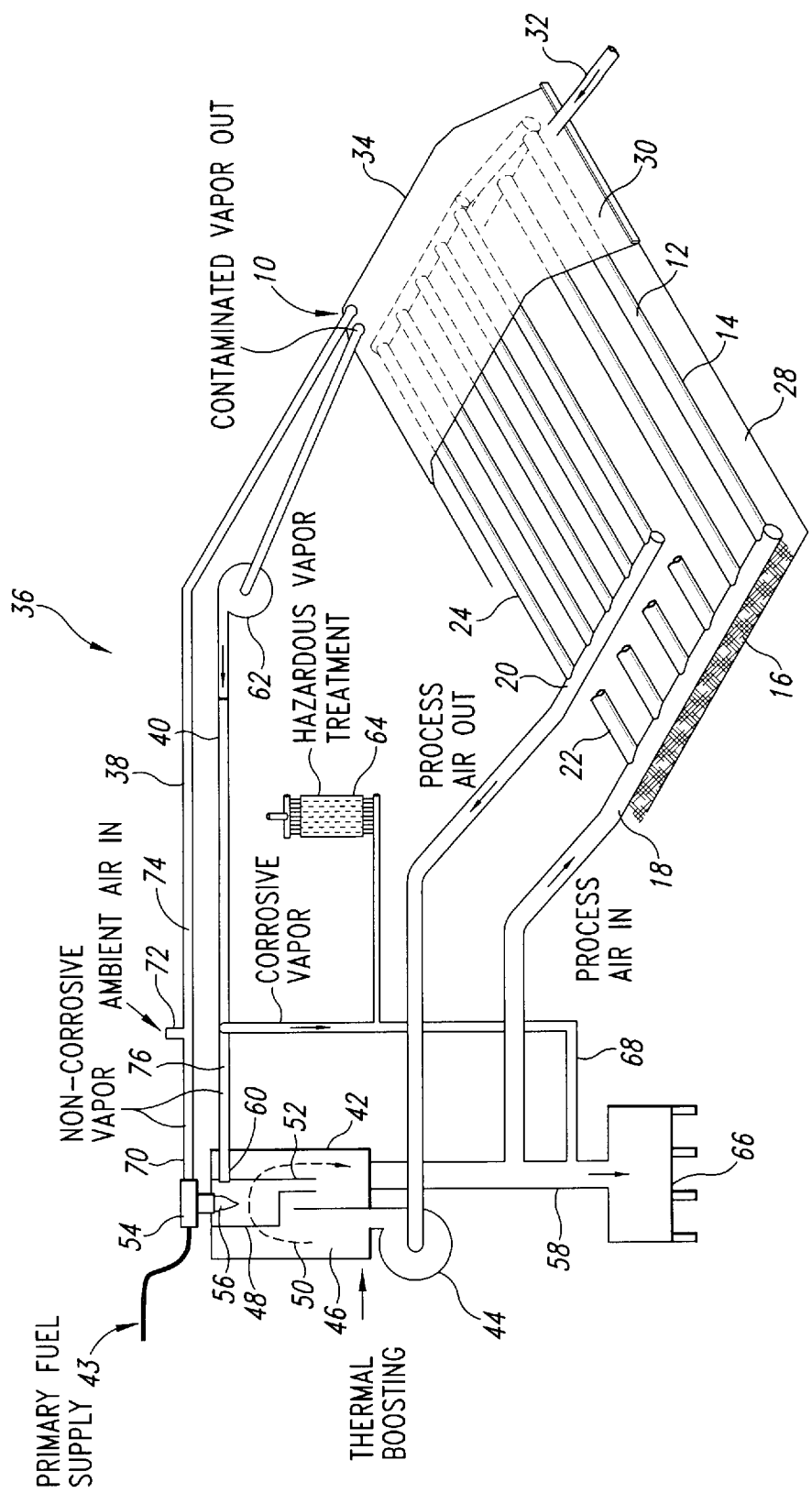
FIG. 2 is an illustration of the treatment system formed in accordance with the present invention.
Figure 3:
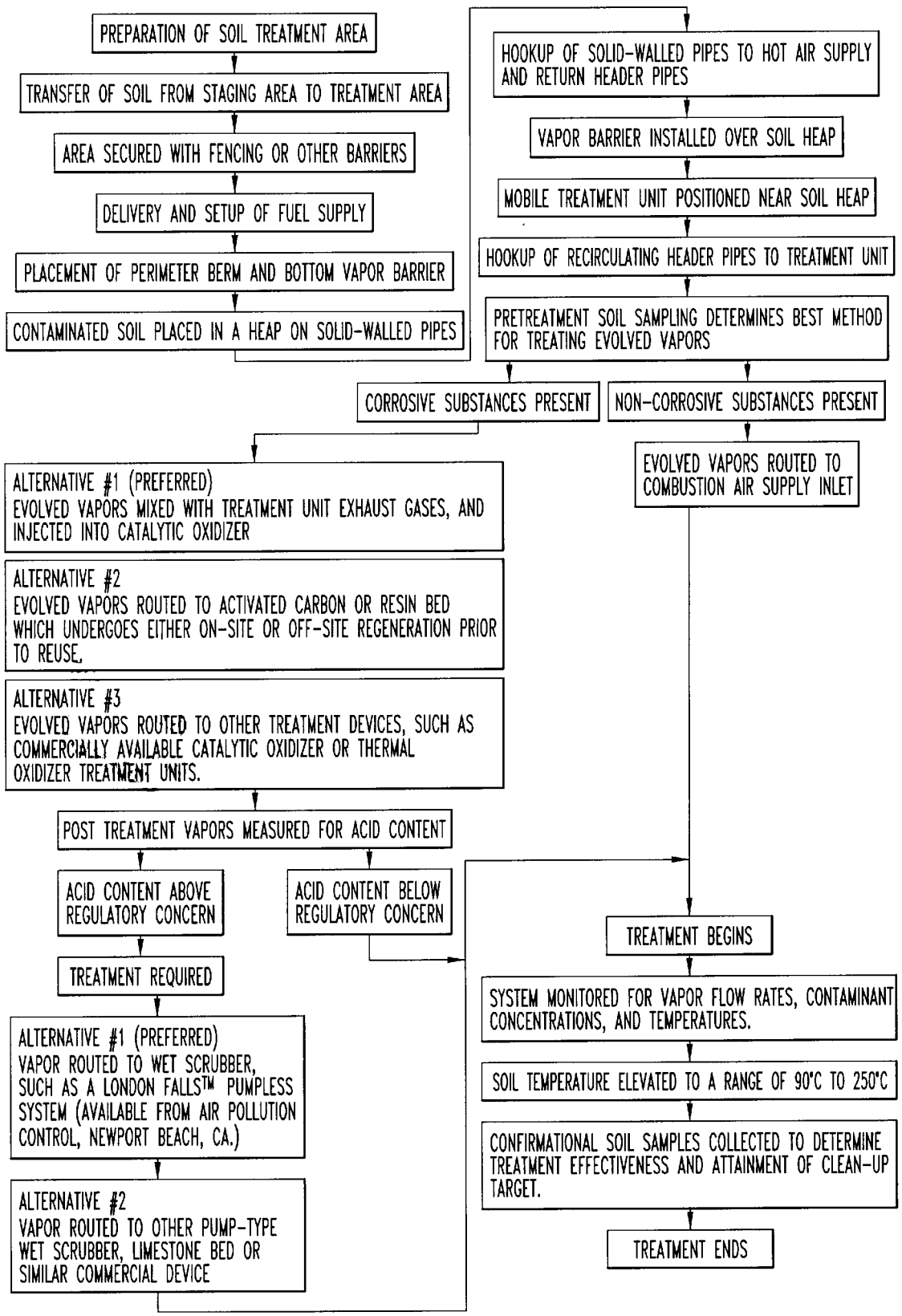
FIG. 3 is a block diagram representing the steps of the method of the present invention.

FIGS. 1 and 2 show a representative embodiment of an ex situ cleaning apparatus 10 formed in accordance with the present invention, while FIG. 3 shows the steps of the method for cleaning contaminated soil utilizing the apparatus of the present invention, including alternative steps as described herein.

Referring to FIG. 1, depicted therein is the apparatus 10 comprising solid-walled hot air conduits 12 connected in a closed-looped array 14 within a heap of soil 16. The array 14 of conduits 12 includes an air supply header 18 and an air return header 20.

As shown in FIG. 1, the array 14 is configured to have a first layer 22 and a second layer 24 of conduits 12. It is to be understood, however, that any number of layers may be used as necessary, limited only by economic and space constraints. One or more connecting conduits 26 provide fluid communication between the first layer and second layer 24 of conduits 12. Ideally, the conduits 12 are formed of solid-walled, schedule 40 or thicker steel pipe. However, depending on the temperatures being used, pipes formed from other heat conductive material would also be suitable, such as aluminum, black pipe, copper, etc. The preferred range of pipe diameters is from 4 inches to 12 inches, although diameters ranging from 2 inches to 16 inches and even greater can be used.

In order to keep the heat and the evolved vapors in a confined space, an impervious liner or base 28 is used underneath the apparatus 10 and the soil 16. The base 28 also serves to insulate the underlying supporting surface from high temperatures. Thus, it is preferred that the base be constructed of material that is impervious to air and liquid, and, depending on the amount of heat being generated, have some resistance to heat. Suitable materials will range from plastic to fiber glass to high temperature fabric. In addition, an impervious cover 30 is placed over the soil and the array 14 of conduits 12, and it is attached to the base 28 around its perimeter. Attachment may be by suitable methods, such as tape, sealant, adhesive, a wood strip, or other means that provides a barrier to the flow of air. The material of the cover 30 is of a 10 mil or thicker plastic or a high temperature fabric, similar to the base 28. A fresh air port 32 is formed in the cover to permit the flow of ambient air into the covered area. The soil 16 and conduits 12 are enclosed within an impervious bubble 34 formed by the base 28 and the cover 30.

In the embodiment depicted in FIG. 1, a first layer of soil 16 is placed on top of the base 28. The first layer 22 of conduits 12 is placed on the soil 16, which is then covered with an additional layer of soil 16. The second layer 24 of conduits 12 is placed on the second layer of soil 16, which is then followed by a third layer of soil 16. Assuming a base dimension "x" of 30 feet in width and a length "y" of 70 feet, suitable height dimensions would be as follows: dimension "a" for the first layer of soil 16 would be preferably be in the range of 4 inches to feet, but ideally 6 inches. The second dimension "b" for the pipes vary from 2 inches to 16 inches, but in this case could be 1 foot. Dimension "c" representing the second layer of soil 16 would be in the range of 1 foot to 3 feet, and ideally 2 feet high. Dimension "d" is the thickness of the second layer 24 of conduits 12, which in this case would be slightly less than 1 foot. Finally, the third layer of soil represented by dimension "e" would be in the range of 8 inches to 2 feet, and preferably 1 foot high. As previously described above, while an unlimited number of levels of pipe arrays 14 and soil 16 can be used, the present invention is most efficient with a heap of soil 16 in the range of 8 feet to 12 feet tall. This would represent five or more levels if two feet of soil were placed between each level. Greater efficiency is achieved by having more centrally embedded arrays 14 in the heap of soil 16.

It should be noted in FIG. 1 that the first layer 22 of conduits 12 have a diameter that is larger than the diameter of conduits 12 in the second layer 24. This change in diameter is to accommodate the decrease in air volume resulting from cooling of the air as it flows through the conduits 12. In other words, heated air forced into the air supply header 18 cools and becomes more dense as it flows through the first layer 22, the connecting conduit 26 and into the second layer 24.

As a result, less space is needed within the conduits 12, and small diameter conduits 12 can be used for greater efficiency and at a lower cost. Ideally, the larger diameter pipes are at the bottom of the heap to generate greater heat conductivity at the base of the heap of soil 16.

Referring next to FIG. 2, illustrated therein is the entire system 36 of the present invention utilizing the apparatus 10 described in conjunction with FIG. 1. The system 36 includes all of the apparatus 10 plus the additional components described herein below. More particularly, evolved vapor is extracted from the bubble 34 by a first collection duct 38 and a second collection duct 40. These ducts 38 and 40 are in fluid communication with a heat booster 42. Pressure within the bubble 34 is equalized by placement of the ambient air port 32 on the opposite side from the first and second collection ducts 38 and 40.

A process blower 44 extracts air from the closed array 14 of conduits 12 and sends it to the heat booster 42. Primary fuel for the heat booster is provided by a primary fuel supply line 43. The heat booster 42 has a first chamber 46 for receiving the air from the array 14 of conduits 12. A second chamber 48 in the heat booster 42 is used to control temperature and turbulence in the vicinity of the flame 56. The recirculated air 50 is mixed with heated air 52 from a burn unit 54. The burn unit 54 receives combustion air from the first collection duct 38, and a flame envelope 56 is generated therefrom. Evolved vapor from the second collection duct 40 is introduced to the flame envelope 60 at the side of the heat booster 42. The purified hot air 52 is mixed with the extracted processed air 50 and recirculated as hot air 58 to the air header supply 18 and thence to the array 14 of conduits 12.

An ambient air port 72 on the first collection duct 38 introduces outside air to the evolved vapors to dilute the vapor as necessary in order to provide a pure and hot flame at the burn unit 54. In the event there is a build up of evolved vapor that could result in a high temperature meltdown or an explosive reaction, a blower 62 in the second collection duct 40 can increase the extraction of evolved vapor from the bubble 34, where it is injected into the flame envelope 56. The burning of evolved vapors at the burn unit 54 purifies the air when hydrocarbon fuels are present in the evolved vapor. In the event hydrocarbon fuels are not present in the evolved vapor, then dampers or valves (74 and 76) in the first and second collection ducts 38 and 40, respectively would be used to close the ducts 38 and 40 and ambient air introduced to the ambient air port 72 would provide the combustible air for the burn unit 54.

In the event hydrocarbon fuels or other burnable substances are not present in the evolved vapor, then the second collection duct 40 would be used to route the corrosive vapor to one of two other treatment devices for processing.

If the evolved vapor contained corrosive materials, such as PCBs, the evolved vapor would be routed to activated carbon columns, a resin bed stripper, or other suitable device 64 for removal of the corrosive material. Alternatively, the corrosive vapor could be routed to a catalytic converter 66 where the corrosive vapor 68 is mixed with hot air 58 for effective catalytic oxidation. Again, the routing of corrosive vapor can be done with suitable dampers and control valves as will be evident to one of ordinary skill in the art.

As shown in FIG. 2, evolved non-corrosive vapor 70 is routed to the burn unit 54 and flame envelope 56 that is provided by a 1,000 to 4,000 mBtuh Oven Pak Model 400 burn unit, which is available from Maxon Corporation located in Muncie, Ind. The clean, evolved vapor is discharged to the specially designed pathway of the second chamber 48 prior to mixing with recirculating hot air 50 for distribution to the hot air supply header 18.

In one embodiment of the invention, pressures within the hot air conduits 12 are equalized by discharging off-setting processed air downstream of the heat booster 42, which provides high vapor temperatures for effective catalytic oxidation that is employed for additional polishing of discharged vapor. The process blower 44 is preferably located upstream of the heat booster 42, and consists of a Dayton 10 HP, 5000 CFM, radial blade belt-driven blower using a heat slinging attachment. As described above, if corrosive vapors are present, they are preferably drawn through the second collection duct 40 by a 3 HP, 1000 CFM blower 62 to the properly fitted catalytic oxidizer 66, which can be obtained from Degussa Corporation of Akron, Ohio. Here, corrosive vapor 68 is mixed with the hot air 58 to supply the heat necessary for catalytic oxidation as described above. Other treatment alternatives may be used to treat corrosive vapor as described below.

FIG. 3 illustrates the steps of the method of the present invention, along with alternative steps as indicated and as described herein.

As will be readily appreciated from the foregoing, the present invention provides a mobile ex situ conductive soil heating apparatus and process wherein the contaminants are vaporized and displaced from the soil pore spaces by dehumidification. The remediation process is accomplished through heat transfer between hot conduits 12 embedded within the ex situ soil heap and mass transfer resulting from the distillation of the soil water and the transport of steam entrained contaminants toward the soil heap surface. The evolved vapor is subsequently trapped by the impervious cover 30 placed over the soil heap 16 and kept off the soil surface by a steel conduit gridwork (not shown), forming a bubble 34. Preferably the bubble 34 operates at a very slight vacuum of 0.01 to 0.05 inches of water column, inhibiting fugitive emissions. The evolved vapors are drawn off by applying a slightly negative pressure through the collection ducts 38 and 40.

The impervious cover 30 may be draped over a metal (or nonferrous) gridwork erected over the treatment cell, minimizing condensation while facilitating evacuation of evolved vapor. Alternatively, where non-hazardous vapors are present, the impervious cover 30 may be kept aloft (inflated) by blowing ambient air therein, sweeping the evolved vapors toward collection ducts. Corrosive or hazardous vapors are directed toward a properly configured treatment device 64. When the evacuated vapors are non-corrosive, the vapors are directed toward the heat booster 42 for thermal oxidation where its heat value will be recovered.

One principal aspect of this invention is the remediation of soil contaminated with chlorinated solvents, PCB's, and PAH's. In these cases, the corrosive or hazardous vapor drawn from the soil 16 is routed to activated carbon columns or a resin bed stripper, or is destroyed by catalytic oxidation or incineration possibly in combination with a wet scrubber.

For treating corrosive vapors 68, the preferred embodiment of this invention employs an on-site regenerable adsorption (RA) system 64 that is instituted by configuring the adsorbent in a series of beds. One bed or a series of beds can treat influent air while other beds undergo a desorption cycle. The system optimally consists of three identical adsorbent beds, configured with a bed capacity to allow a contact time with the vapor influent of greater than 0.7 seconds with a pressure drop of 25 centimeters of water. The speed of desorption (regeneration) of the adsorption bed is a rate-limiting step, which determines how quickly a desorbed bed can be cycled back into service. Desorption times for each bed are expected to be three hours to desorb to below 10 percent of the adsorption beds weight gain.

Site specific desorption cycles include adjustment to the temperature-swing used to desorb the target compounds, reduced tank pressures and purge gas flows. During each desorption cycle, the chlorinated material trapped within the adsorption bed is volatilized, condensed and transferred as a liquid to a storage tank. The RA system utilizes a near emission-free, closed-loop process. On-site processing of chlorinated concentrates can be accomplished by combined decanting and distillation, further reducing recycling and disposal costs.

A lower cost alternative to the RA process employs use of catalytic oxidation. Widely available catalytic oxidation systems are capable of treating a broad range of VOC's and inorganic compounds. Because the reaction temperature should be maintained in the range from 285° C. to about 650° C., latent heat is provided to the steam entrained vapor stream by blending the evolved vapor with controlled volume of hot air 58 diverted from the heat booster 42. Depending upon the VOC concentrations entering the catalytic oxidizer 66, less heated air may be necessary once the exothermic reaction begins. An acid vapor may be a by-product of catalytic oxidation. Neutralization of acid vapor may be accomplished by any process known to the art, such as the use of wet scrubbing systems or limestone beds located immediately downstream of the catalytic oxidizer.

Alternatively, when non-corrosive and non-hazardous vapors are present, the evolved vapors may become part of the combustion air supply for the heat booster 42. The heat booster 42 is preferentially designed to both heat air for distribution to the hot air conduits and to destroy non-corrosive contaminants removed from the treatment cell. The heat booster 42 includes two chambers, the primary combustion zone 48 constructed for maximum flame contact with evolved vapors, and the second chamber 46 for efficient routing of the hot cleaned air toward the hot air supply header for distribution to the hot pipe conduits. Partitioning of the primary burn zone from recirculating air permits optimum destruction of contaminants by controlling temperatures and turbulence in the vicinity of the flame. Under this embodiment, the evolved vapor is injected through a sidewall orifice 60 and into the flame envelope 56 of the heat booster 42 or the combustion air may be mixed with the evolved vapor prior to injection into the flame envelope 56.

The system requires an ambient discharge to offset the combustion air supply drawn into the system for burn unit operation. Thus, all embodiments of this invention include placement of a catalytic oxidizer 66 downstream of the burn chamber, which polishes the vapor before discharge to the atmosphere.

While representative embodiments of the present invention have been illustrated and described herein, it is to be understood that various changes may be made therein without departing from the spirit and scope of the invention. Thus, the invention is to be limited only by the scope of the appended claims.

The embodiments of the invention in which an exclusive property or privilege is claimed are defined as follows:

1. A method for ex situ cleaning of contaminated soil using a closed system of heat-conductive solid-walled pipes embedded in the contaminated soil, the pipes being in communication with a heat source that heats and circulates air throughout the system of pipes, the method comprising the steps of:

placing the contaminated soil in a heap on the pipes;

substantially enclosing the soil heap with a vapor barrier;

circulating heated air throughout the pipes to elevate the temperature of the surrounding soil to a temperature sufficient to cause vaporization of soil contaminates;

extracting the vapor containing the soil contaminants from the enclosed soil heap; and treating the vapor containing the soil contaminants to remove the soil contaminants from the vapor.

2. The method of claim 1, wherein said step of circulating heated air includes elevating the temperature of the surrounding contaminated soil to a temperature in the range of 90° C. to 250° C.

3. A method for ex situ cleaning of contaminated soil using an array of heat-conductive solid-walled pipes, the array of pipes being in communication with a heat source that heats and circulates air throughout the array of pipes, the method comprising the steps of:

forming a base out of a vapor barrier;

placing the array of solid-walled pipes over the vapor barrier base and connecting the array of pipes to the heat source;

covering the array of pipes with a heap of contaminated soil; and circulating heated air throughout the array of pipes to cause vaporization of soil contaminants.

4. The method of claim 3, wherein said step of covering the array of pipes with contaminated soil further comprises substantially enclosing the heap of soil with a vapor barrier covering.

5. The method of claim 3, wherein said step of circulating heated air throughout the array of pipes causes the temperature of the surrounding soil to be raised to a temperature in the range of 90° C. to 250° C.

6. The method of claim 5, comprising the further steps of:

extracting the vaporized soil contaminants from the enclosed soil heap; and treating the vaporized soil contaminants to remove the soil contaminants from the vapor.

\* \* \* \* \*